(No Model.)
M. VAN GELDER & F. BATCHELOR.
HARROW.
No. 245,033. Patented Aug. 2, 1881.
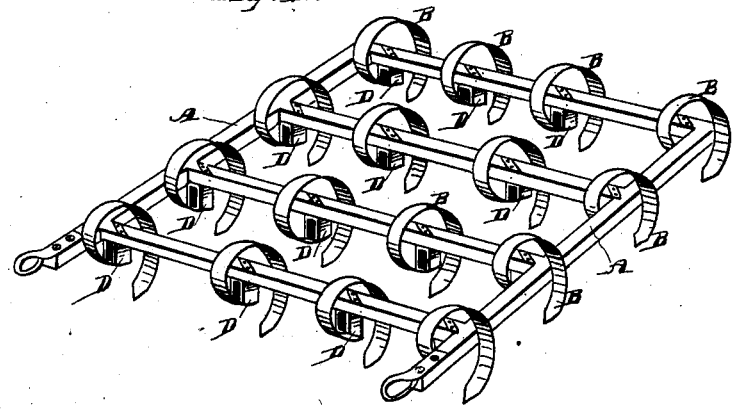
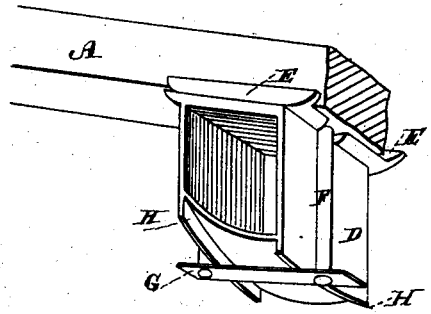
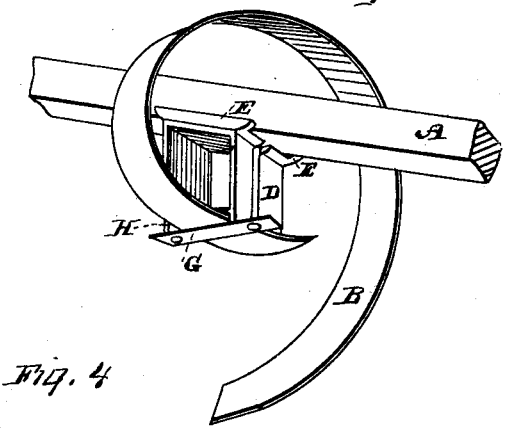
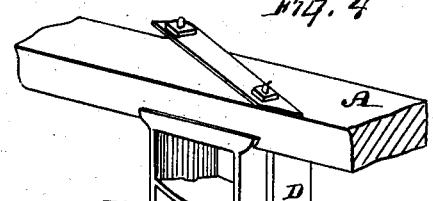
Witnesses
Geo. H. Strong.
Frank A. Brooks
Inventors,
Morris Van Gelder
Frank Batchelor
By Dewey & Co.
Attys

UNITED STATES PATENT OFFICE.

MORRIS VAN GELDER AND FRANK BATCHELOR, OF SACRAMENTO, CAL., ASSIGNORS TO BATCHELOR, VAN GELDER & CO., OF SAME PLACE.

HARROW.

SPECIFICATION forming part of Letters Patent No. 245,033, dated August 2, 1881.

Application filed February 4, 1881. (No model.)

*To all whom it may concern:*

Be it known that we, MORRIS VAN GELDER and FRANK BATCHELOR, of Sacramento city and county, State of California, have invented an Improved Harrow; and we hereby declare the following to be a full, clear, and exact description thereof.

Our invention relates to certain improvements in harrows, and it is especially applicable to that class of harrows in which curved or other forms of elastic teeth are secured to the harrow-frame, either above, below, or at one side, so that their points will enter the ground and pulverize and cultivate it.

Our invention consists in the employment of a shoe or shoes or projections beneath the harrow-frame, between it and the fastening-clip, to which the teeth may be secured, so that while the teeth may be adjusted to enter the ground to any desired depth the harrow-frame will be prevented from dragging upon the surface of the ground, as will be more fully described in the accompanying drawings, in which—

Figure 1 is a view of a harrow with our improvement. Figs. 2, 3, and 4 are details of construction.

In the construction of harrows having spiral or elastic teeth, as shown, the position of the teeth causes them to enter the ground, and often allows the harrow-frame to run down close to it, especially in light, dry, or sandy soils, and also when the soil is very wet, or if the teeth are set to make a shallow cut. This prevents a free escape between the bars of the harrow, and when the soil is gravelly or stony it is necessary to sheath the bars with sheet metal, to prevent a too rapid wear of them.

In our invention we provide a series of shoes or attachments which extend below the harrow-frame and have their lower surfaces formed to receive and hold the ends of the teeth, which are clipped strongly to them. This allows the teeth to enter the ground to any desired depth; but at the same time these extensions serve as shoes, which ride over the ground and serve to prevent the harrow-frame from being drawn down upon the ground, as before described, and thus save it from wear, while leaving spaces beneath it for the escape of straw, weeds, or anything which would cause it to become clogged.

A is the frame of a harrow, and B are the teeth. These teeth may be of various forms, and may be secured in various ways, many of which are now well known. In the present case we show a harrow having teeth similar to those in the reissued patent of D. L. Garver, No. 9,148, April 13, 1880.

Our attachment D may be made in any suitable form; but we have shown it in the present case as being made hollow, of cast or malleable metal, and having one or more flanges, E, turning up at each end, so as to embrace the lower edge of the frame to steady it in place.

The side of the attachment may be grooved, as shown, so as to admit the bolts F to extend down through the frame to the plate G, through which they pass.

The lower face of this attachment is formed to allow the harrow-tooth to fit upon it, and slight ledges H prevent any side movement or twisting of the tooth out of place. The clip bar or plate G extends across below this part of the tooth, and when the nuts upon the upper ends of the bolts F are screwed down firmly the whole will be held in place. By loosening the bolts the teeth may be adjusted at will.

This attachment will be found of great advantage in protecting the harrow from wear, and in raising the frame from the ground, so that it will not become clogged, while allowing the teeth to work to any desired depth.

Having thus described our invention, what we claim as new, and desire to secure by Letters Patent, is—

In a harrow, the bar A, spring-tooth B, and fastening-clip G, in combination with a box or shoe, D, inserted between the lower side of bar A and the fastening-clip, as specified.

In witness whereof we have hereunto set our hands this 17th day of January, A. D. 1881.

MORRIS VAN GELDER.
    FRANK BATCHELOR.

Witnesses:
 ADD. C. HINKSON,
 J. H. PARNELL.